July 19, 1932.   C. DALTON   1,867,938
FREE WHEEL OR RATCHET CLUTCH
Filed Dec. 12, 1931   2 Sheets-Sheet 1

July 19, 1932.  C. DALTON  1,867,938
FREE WHEEL OR RATCHET CLUTCH
Filed Dec. 12, 1931   2 Sheets-Sheet 2
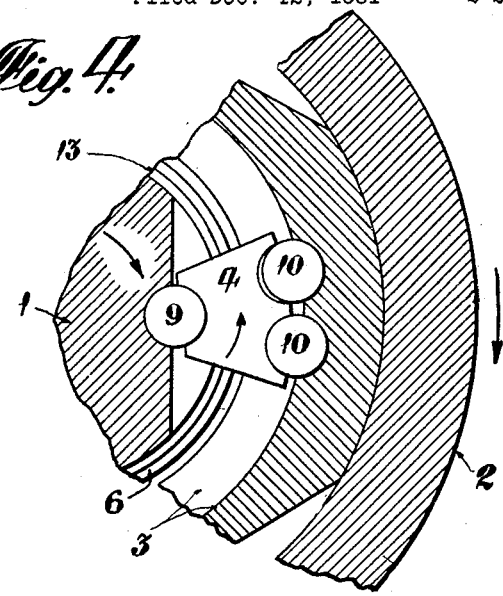
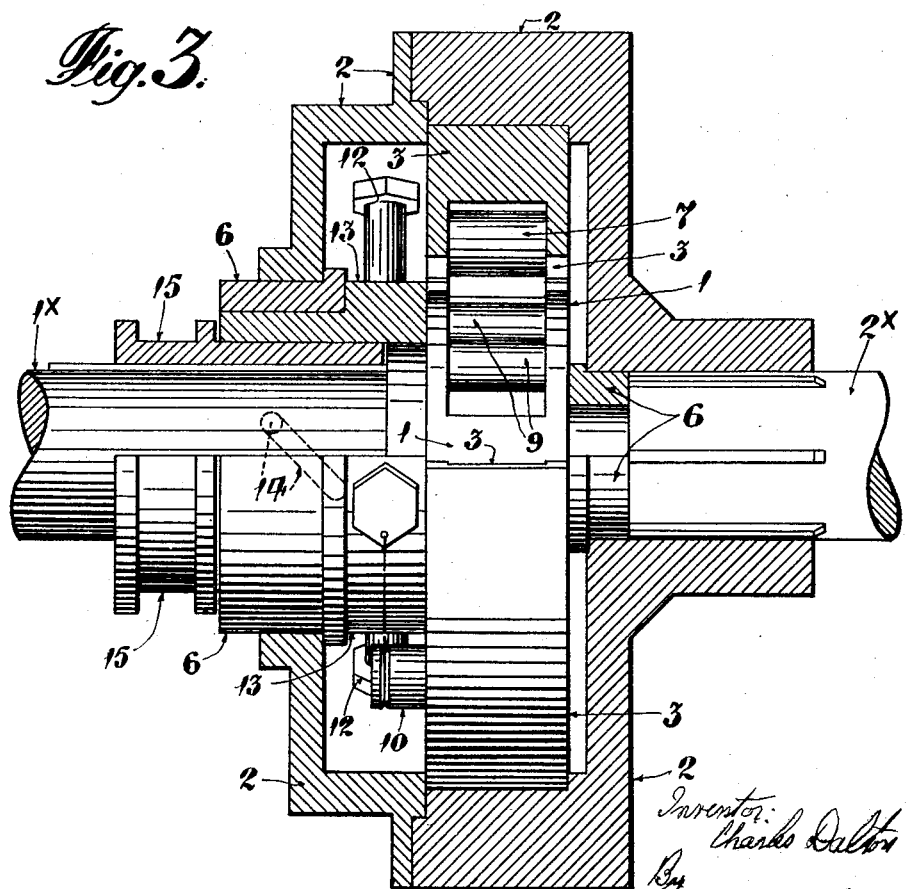

Patented July 19, 1932

1,867,938

UNITED STATES PATENT OFFICE

CHARLES DALTON, OF LEEDS, ENGLAND

FREE WHEEL OR RATCHET CLUTCH

Application filed December 12, 1931, Serial No. 580,674, and in Great Britain December 15, 1930.

This invention relates to an improved free wheel or ratchet clutch of the type in which the drive is transmitted from the driving member to the driven member by the wedging action of toggle struts transmitting substantially radial compressive forces from the driving to the driven member and operating upon shoes or equivalent separate members which bear against the driving or driven member, the struts being so disposed that movement thereof tending to position them radial to or with the clutch centre effects a rigid frictional drive between the driving and driven members.

According to the invention, the mounting of the shoe on its associated driving or driven member through the medium of the drive transmitting toggle strut or struts is such as to afford a wedging action in both directions of motion whereby the shoe is forced into contact with the other member, means being provided for suppressing drive in either direction at will. Thus the shoe may be mounted on the driving or driven member through the medium of two sets of struts or rigid links, all the links in any one set being inclined almost at right angles to the direction of motion of the clutch and struts or links in different sets being inclined in opposite sense, whilst in the preferred construction the shafts are coaxial and the driving and driven members are disposed one within the other. When no drive is being transmitted the shoes may be lightly held in contact with the driven member by means of suitable springs, and pairs of oppositely inclined struts or links may be afforded by single members and suitable means may be provided for adjusting the tension of such springs so as to suitably position the duplicate strut or link members for the direction of free wheel drive required.

In order that the invention may be clearly understood and readily carried into effect, the same will now be more fully described with reference to and by the aid of the accompanying drawings, in which:—

Figure 3 is a part sectional elevation of Figure 2.

Figure 4 is a fragmentary section similar to Figure 2, but illustrating a modified arrangement.

Figure 1:
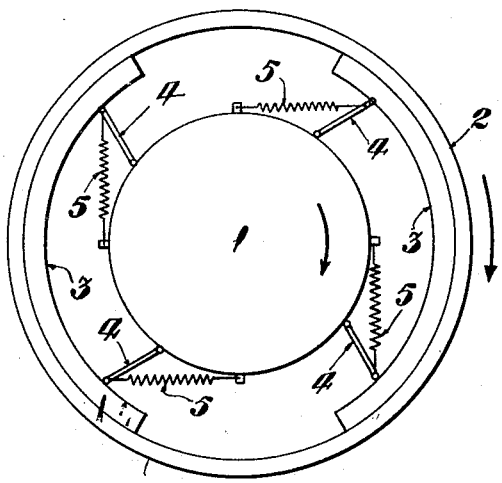
Figure 1 is a diagrammatic view illustrating the principle of operation of the type of free wheel clutch or ratchet to which the invention relates.

Referring now to Figure 1 of the drawings, the type of clutch, as illustrated in one of its simplest forms, comprises a driving member 1, a driven member 2 in the form of a drum surrounding the member 1, and shoes 3 mounted on said driving member 1 by means of rigid pivoted struts or links 4 inclined almost at right angles to the direction of rotation of the clutch.

The shoes 3 which may be lubricated are normally in rubbing contact with the drum 2 and are preferably maintained in this position by means of springs 5 although this is strictly only necessary to ensure immediate take up of the drive on reversal. It will be seen that when the driving member 1 is rotated in a clockwise direction there will be a tendency for the struts or links 4 to move into a radial position by reason of the friction between the shoes 3 and the drum 2, thus forcing said shoes against said drum and so transmitting the drive, whilst if the member 1 is rotated in an anti-clockwise direction the struts or links will tend to make a smaller angle with the direction of rotation and merely remain in the position illustrated by reason of the action of the springs 5, no drive being transmitted. It will be understood that the drive could quite as well be applied through the drum 2 as through the member 1.

Figure 2:
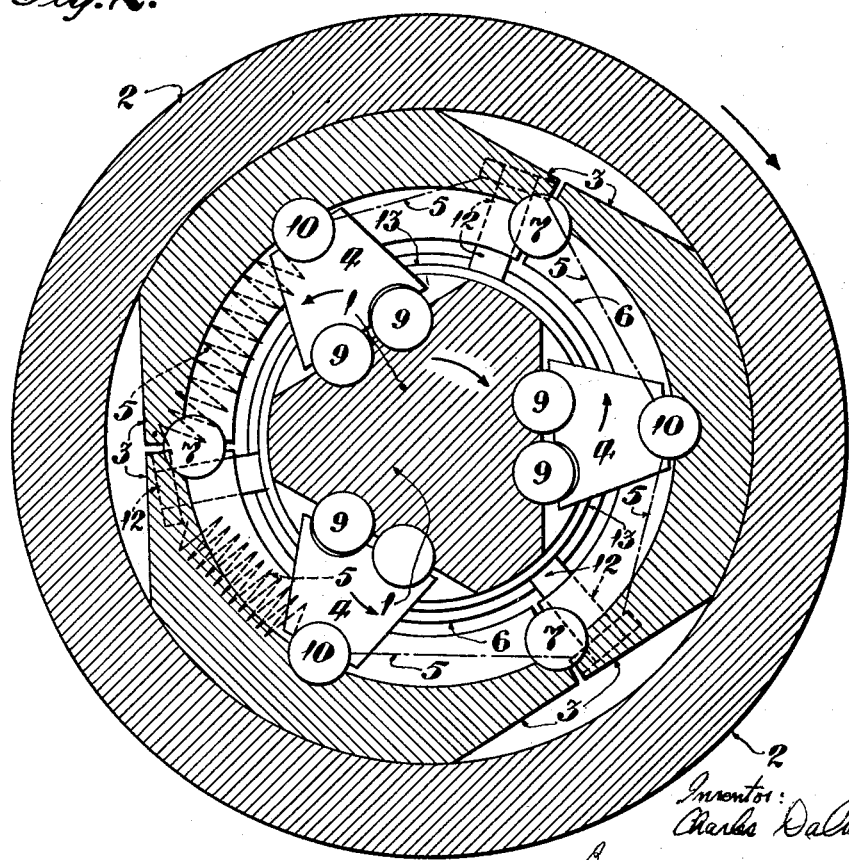
Figure 2 is a transverse section of a clutch constructed according to one embodiment of the invention and shown as driving in a clockwise direction.

Referring to the embodiment of the invention illustrated in Figures 2 and 3, the driving member 1 is mounted on a shaft 1ˣ and rotates in bearings afforded by bushes 6 in the rotatable drum which latter constitutes the driven member 2 and is keyed to the driven shaft 2ˣ. The drive is transmitted between the member 1 and the drum 2 by shoes 3, which may be bevelled to ensure a smooth take up. Three of such shoes are provided and they are distanced apart by pins 7. The driving member 1 is formed with three flat-bottomed channels, one corresponding to each of the shoes 3, and the latter are supported on the driving member through the medium of struts or links 4 bearing at one end on pins 9 carried in slots in the driving member 1 and at the other on pins 10 on the shoes 3. Each set of pins 9, 10 is disposed in triangular formation and each strut or link is adapted to interconnect all three pins 9, 10 and it will be seen that this arrangement is the equivalent of two sets of struts or links inclined equally but in opposite senses to the direction of rotation and that the struts or links 4 are consequently capable of pivoting about either of the pins 9 to force the shoes 3 outwardly and so can afford a free wheel drive in either direction. Further, the struts or links can be maintained in a neutral position, in which the shoes 3 are merely in rubbing contact with the drum 2 and the clutch therefore transmits no drive in either direction. In order to give the links the initial setting suitable for the required direction of free wheel drive, each pair of pins 10 is connected by springs 5 to a common support which is angularly adjustable about the driving member 1, and which in this case takes the form of a pin 12 mounted on a sleeve 13 adapted to be given the required angular movement relative to the driving member by virtue of its pin and slot connection 14 with a slidable sleeve 15 keyed to the driving shaft 1ˣ. Said sleeve 15 may be actuated by any convenient lever mechanism and in this connection the latter may have suitable locking means in order to enable the clutch to be maintained in the desired position. In order to reduce the number of springs, the pins 10 may be interconnected by a three legged spider and only one pair of springs provided to connect one of the pins 10 with the sleeve 13.

Instead of being based on the driving member 1, the triangular formation of the pins 9, 10 may be reversed as shown in Figure 4. The principle of operation is exactly the same but instead of the struts or links 4 pivoting about a different point on the driving member 1 for each direction of rotation the pivoting point is constant and the point of application of the force to the shoes is varied.

I claim:—

1. A free wheel or ratchet clutch comprising in combination, a driving member, a driven member, a shoe associated with one of said members, radially acting drive transmitting toggle struts which afford a wedging action in both directions of motion of the clutch to force the shoe into contact with the associated member, and means for suppressing drive in either direction at will.

2. A free wheel or ratchet clutch comprising in combination, a driving member, a driven member, a shoe associated with one of said members, radially acting drive transmitting toggle struts inclined to the motion of the clutch but in opposite sense to afford a wedging action in both directions of motion of the clutch, and means for suppressing drive in either direction at will.

3. A free wheel or ratchet clutch comprising in combination, a driving member, a driven member, a shoe associated with one of said members, a duplicate strut member affording a pair of radially acting drive transmitting toggle struts inclined to the motion of the clutch but in opposite sense to afford a wedging action in both directions of motion of the clutch, and means for suppressing drive in either direction at will.

4. A free wheel or ratchet clutch comprising in combination a driving member, a driven member, a shoe associated with one of said members, a duplicate strut member affording a pair of radially acting drive transmitting toggle struts grooved at both ends and inclined to the motion of the clutch, but in opposite sense, pins co-operating with the grooves in the ends of the toggle struts and with the shoe and other member to afford a wedging action in both directions of motion of the clutch, and means for suppressing drive in either direction at will.

5. A free wheel or ratchet clutch comprising in combination, a driving member, a driven member, a shoe associated with one of said members, a duplicate strut member affording a pair of radially acting drive transmitting toggle struts grooved at both ends and inclined to the motion of the clutch but in opposite sense, pins co-operating with the grooved ends of the toggle struts and the shoe and the other member to afford a wedging action in both directions of motion of the clutch, and means for initially positioning the duplicate strut member suitably for the direction of drive required.

6. A free wheel or ratchet clutch comprising in combination, a driving member, a driven member, a shoe associated with one of said members, a radially acting duplicate strut member having a groove at one end and two grooves at the other end, pins co-operating with the grooves in the ends of the duplicate strut member and with the shoe and the other member to afford a wedging action in both directions of motion of the clutch, and means for rocking said duplicate strut member about certain of said pins to position it from one operative position to the other according to the direction of drive required.

7. A free wheel or ratchet clutch comprising in combination co-axial driving and driven members, a shoe associated with one of said members, a duplicate strut member affording a pair of radially acting drive transmitting toggle struts inclined to the motion of the clutch but in opposite sense to afford a wedging action in both directions of motion of the clutch, supports angularly adjustable about the driving member and at either side of the duplicate strut member, springs connecting said duplicate strut member to the supports on either side thereof, and means for angularly adjusting said supports to position the duplicate strut member according to the direction of drive required.

8. A free wheel or ratchet clutch comprising in combination, co-axial driving and driven members, a shoe associated with one of said members, a duplicate strut member affording a pair of radially acting drive transmitting toggle struts inclined to the motion of the clutch but in opposite sense to afford a wedging action in both directions of motion of the clutch, a sleeve angularly adjustable through a pin and slot connection relatively to the driving member, pins on said sleeve and at either side of the duplicate strut member, springs connecting said duplicate strut member to said pins on either side thereof, and means for operating said sleeve to angularly adjust said supports and thereby position the duplicate strut member according to the direction of drive required.

9. A free wheel or ratchet clutch comprising in combination, co-axial driving and driven members, a shoe associated with one of said members, a radially acting duplicate strut member having a groove at one end and two grooves at the other end, pins co-operating with the grooves in the ends of the duplicate strut member and with the shoe and the other member to afford a wedging action in both directions of motion of the clutch, an angularly adjustable sleeve, pins on said sleeve and at either side of the duplicate strut member, springs connecting said duplicate strut member to said pins on either side thereof, and a further sleeve slidably keyed to the driving member, and pin and slot mechanism interconnecting the two sleeves.

CHARLES DALTON.